(12) United States Patent
Sun et al.

(10) Patent No.: US 12,457,176 B2
(45) Date of Patent: Oct. 28, 2025

(54) COMPUTER NETWORK CONGESTION CONTROL MANAGEMENT

(71) Applicant: Lemon Inc., Grand Cayman (KY)

(72) Inventors: Yan Sun, Los Angeles, CA (US); Hang Zhu, Los Angeles, CA (US); Lishan Li, Los Angeles, CA (US); Jianxi Ye, Los Angeles, CA (US); Huan Sun, Los Angeles, CA (US)

(73) Assignee: Lemon Inc., Grand Cayman (KY)

( * ) Notice: Subject to any disclaimer, the term of this patent is extended or adjusted under 35 U.S.C. 154(b) by 245 days.

(21) Appl. No.: 18/299,659

(22) Filed: Apr. 12, 2023

(65) Prior Publication Data

US 2023/0254262 A1 Aug. 10, 2023

(51) Int. Cl.
*H04L 47/50* (2022.01)
*H04L 47/12* (2022.01)
*H04L 47/30* (2022.01)

(52) U.S. Cl.
CPC .............. *H04L 47/50* (2013.01); *H04L 47/12* (2013.01); *H04L 47/30* (2013.01)

(58) Field of Classification Search
CPC ......... H04L 47/10; H04L 47/30; H04L 47/32; H04L 47/12; H04L 47/29; H04L 47/50; H04L 49/90; H04L 47/26; H04L 47/2441; H04L 47/193; H04L 49/3045; H04L 47/11; H04L 47/17; H04L 47/20; H04L 47/2408; H04L 47/31; H04L 49/901; H04L 49/3018; H04L 47/125; H04L 47/2433; H04L 47/266; H04L 47/24; H04L 47/6215;
(Continued)

(56) References Cited

U.S. PATENT DOCUMENTS 11,323,309 B1 * 5/2022 Seth ..................... H04L 45/60
2005/0083837 A1 * 4/2005 Maehara ............. H04L 1/0061
370/252
(Continued)

FOREIGN PATENT DOCUMENTS

WO 2018108093 A1 6/2018

OTHER PUBLICATIONS

European Patent Office, Communication Pursuant to Rules 70(2) and 70a(2) EPC and reference to Rule 39(1) EPC for European Application No. 24168296.2, mailed Oct. 21, 2024, 2 pages.
(Continued)

*Primary Examiner* — Djenane M Bayard
(74) *Attorney, Agent, or Firm* — Alleman Hall & Tuttle LLP

(57) ABSTRACT

A computer system for managing congestion control of packets includes a processor that implements a network traffic manager including a congestion controller and a socket. The congestion controller determines messages parameters for packets of a plurality of messages and assigns a congestion control algorithm setting to each packet based on the message parameters associated with each packet. The socket includes a buffer with a queue having a plurality of threshold queue positions. The congestion controller determines that a subset of packets exceeds at least a first threshold queue position and selects a congestion control action for each packet in the subset based on the assigned congestion control setting for each respective packet and a position of each respective packet relative to the plurality of threshold queue positions.

20 Claims, 7 Drawing Sheets

(58) Field of Classification Search
CPC ............. H04L 47/6275; H04L 49/9047; H04L 43/0829; H04L 47/27; H04L 47/326; H04L 47/39; H04L 49/9057; H04L 43/0882; H04L 45/24; H04L 49/9078; H04L 2012/5682; H04L 41/0896; H04L 43/16; H04L 45/02; H04L 45/121; H04L 45/74; H04L 47/525; H04L 47/621; H04L 49/3027; H04L 49/9005; H04L 2012/5679; H04L 47/122; H04L 47/15; H04L 47/2458; H04L 47/6205; H04L 47/6225; H04L 47/627; H04L 49/506; H04L 49/9084; H04L 51/226; H04L 51/234; H04L 69/16; H04L 47/283; H04L 43/0852; H04L 43/0864; H04L 43/062; H04L 47/2416; H04L 47/263; H04L 47/41; H04L 65/752; H04L 65/80; H04L 43/087; H04L 43/0888; H04L 47/22; H04L 47/25; H04L 47/58; H04L 67/565; H04L 67/568; H04L 67/61; H04L 69/324; H04L 69/40; H04L 47/21; H04L 12/18; H04L 43/0876; H04L 47/13
See application file for complete search history.

(56) References Cited

U.S. PATENT DOCUMENTS

| | | | |
|---|---|---|---|
| 2008/0031267 A1* | 2/2008 | Imao ................... | H04L 69/163 370/401 |
| 2014/0016493 A1* | 1/2014 | Johnsson ............ | H04L 43/0864 370/252 |
| 2017/0085483 A1* | 3/2017 | Mihály ................. | H04L 47/24 |
| 2021/0112006 A1* | 4/2021 | Francini ............... | H04L 47/115 |

OTHER PUBLICATIONS

Cisco, "Congestion Avoidance Overview," Available Online at https://webarchice.org/web/20140228234024/http://www.cisco.com:80/c/en/us/td/docs/ios/12_2/qos/configuration/guide/fqos_c/qcfconav/html, Feb. 28, 2014, 10 pages.

European Patent Office, Extended European Search Report Issued in Application No. 24168296.2, Aug. 2, 2024, Germany, 11 pages.
Sun, Yan et al., "Flexible Load Balancing on Multipath Networks," U.S. Appl. No. 18/295,783, filed Apr. 4, 2023, 40 pages.
Bonaventure, O. et al., "Multipath TCP Deployments," IETF Journal, Nov. 1, 2016, 13 pages.
Brakmo, L. et al., "TCP Vegas: New Techniques for Congestion Detection and Avoidance," Proceedings of the 1994 Conference on Communications Architectures, Protocols and Applications (SIGCOMM 1994), Aug. 31, 1994, London, United Kingdom, 12 pages.
Cardwell, N. et al., "BBR: Congestion-Based Congestion Control: Measuring Bottleneck Bandwidth and Round-Trip Propagation Time," ACM Queue, vol. 14, No. 5, Oct. 1, 2016, 34 pages.
Ha, S. et al., "CUBIC: A New TCP-Friendly High-Speed TCP Variant," ACM SIGOPS Operating Systems Review, vol. 42, No. 5, Jul. 1, 2008, 11 pages.
Han, H. et al., "Overlay TCP for Multi-Path Routing and Congestion Control," IEEE/ACM Transactions on Networking, vol. 14, No. 6, Dec. 1, 2006, 24 pages.
Honda, M. et al., "Multipath Congestion Control for Shared Bottleneck," Proceedings of the 7th International Workshop on Protocols for Fast, Long-Distance Networks (PFLDNeT 2009), May 21, 2009, Tokyo, Japan, 6 pages.
Iyengar, J. et al., "Concurrent Multipath Transfer Using SCTP Multihoming Over Independent End-to-End Paths," IEEE/ACM Transactions on Networking, vol. 14, No. 5, Oct. 1, 2006, 14 pages.
Kelly, F. et al., "Stability of End-to-End Algorithms for Joint Routing and Rate Control," ACM SIGCOMM Computer Communication Review, vol. 35, No. 2, Apr. 1, 2005, 8 pages.
Khalili, R. et al., "MPTCP is not Pareto-Optimal: Performance Issues and a Possible Solution," IEEE/ACM Transactions on Networking, vol. 21, No. 5, Aug. 21, 2013, 16 pages.
Raiciu, C. et al., "Coupled Congestion Control for Multipath Transport Protocols," Internet Engineering Task Force RFC 6356, Oct. 1, 2011, 12 pages.
Wei, D. et al., "FAST TCP: Motivation, Architecture, Algorithms, Performance," IEEE/ACM Transactions on Networking, vol. 14, No. 6, Dec. 1, 2006, 14 pages.
Wischik, D. et al., "Design, implementation and evaluation of congestion control for multipath TCP," Proceedings of the 8th USENIX Symposium on Networked Systems Design and Implementation (NSDI '11), Mar. 30, 2011, Boston, MA, 14 pages.

* cited by examiner

COMPUTER NETWORK CONGESTION CONTROL MANAGEMENT

BACKGROUND

Many network transmission protocols utilize congestion controllers to prevent or remove congestion along network paths by limiting the amount of data that can be sent at one time. Messages and packets may include setting for congestion control algorithms that react to congestion signals to reduce the congestion window and/or sending rate. However, these approaches serve to correct congestion rather than prevent it. As discussed below, opportunities remain for improvements in congestion control, particularly with respect to managing congestion for packets having settings for different types of congestion control algorithms on shared links.

SUMMARY

In view of these issues, computing systems and methods for managing congestion control of packets routed through a packet-switched computer network are provided. In one aspect, the computing system includes a processor that executes instructions using portions of associated memory to implement a network traffic manager. The network traffic manager includes a congestion controller and a socket. The congestion controller determines message parameters for packets of a plurality of messages sent according to a plurality of transport protocols over the network and assigns a congestion control algorithm setting to each packet based on message parameters associated with each packet. The socket includes a buffer that is configured to receive and temporarily store the packet in a queue, the queue of the buffer having a plurality of threshold queue positions. The congestion controller is configured to determine that a subset of the plurality of packets exceeds at least a first threshold queue position of a plurality of threshold queue positions in the buffer and select a congestion control action for each packet in the subset from a plurality of predefined congestion control actions, based upon the assigned congestion control algorithm setting for each respective packet in the subset and based on a position of each respective packet in the subset relative to the plurality of threshold queue positions.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 1.

DETAILED DESCRIPTION

Figure 1:
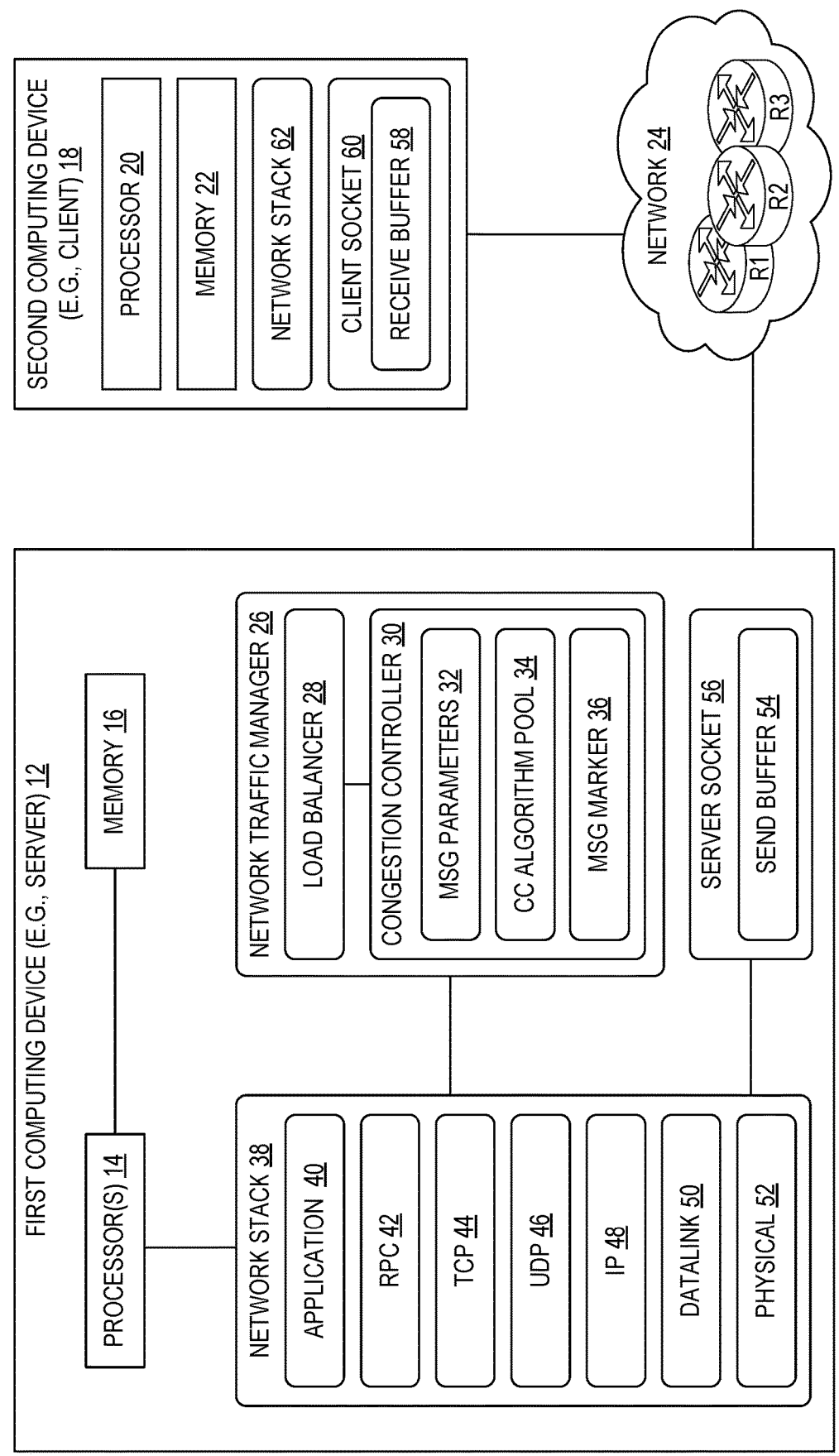
FIG. 1 shows a schematic view of a computing system for managing congestion control of packets routed through a packet-switched computer network, according to one embodiment of the present disclosure.

Transmission control protocol (TCP) is a widely used transport layer protocol that carries a high volume of network traffic on the Internet. This high volume of traffic puts the network at risk of congestion. For example, when a sender device transmits TCP packets at a rate faster than the capacity of the link with the smallest allocated bandwidth in the path, i.e., the bottleneck, the bottleneck router places the packets in a buffer. If the sender device continues to transmit data faster than the packets can leave the buffer, the buffer will fill until there is no room for more packets, and new packets are dropped upon arrival. The lack of an acknowledgement (ACK) serves as signal to the sender device that at least some packets of a message were lost, which is an indicator of network congestion.

Most congestion control algorithms for TCP use a congestion window (CWND) to control sending rate. For each connection, TCP maintains a CWND that limits the total number of unacknowledged packets that may be in transit end-to-end ("bytes in flight"). In other words, if the number of unacknowledged packets is equal to the CWND, the sender stops sending data until more ACKs are received. An additive increase/multiplicative decrease (AIMD) algorithm may be used to control the size of the CWND: for every round trip time (RTT) in which no packet is lost, the CWND is increased by a fixed amount; for every RTT in which a packet loss occurs, the CWND is decreased by a multiplicative factor. Other congestion control algorithms may be applied to optimize throughput and latency by estimating the bottleneck bandwidth and RTT to compute a pacing rate.

Multipath transmission control protocol (MPTCP) uses multiple network paths for a single connection. A benefit of this configuration is that bandwidth can be combined or "pooled" to yield high throughput and high availability time, as packets can be sent over several paths at the same time. In conventional multipath systems, packets are sent on the path with the shortest, smoothest RTT. However, the path with the shortest RTT may have a higher packet loss rate than a path with a longer RTT. For messages that prioritize a high rate of accuracy over a shortest time, the packet loss rate of the path with a shortest RTT may be unacceptable. Further, the packets may be sent equally across multiple paths, regardless of the message parameters. When a packet is lost or times out, the original path may be heavily congested or have a broken link, thereby requiring that the packet be re-sent on a different path, which may result in a longer message completion time, i.e., lag. When packets using different congestion control algorithms and/or different network protocols share a link, packets with latency sensitive congestion control algorithms suffer, as messages sent with packet loss control algorithms or without a congestion control mechanism may result in significant congestion, including buffer overflow, before the sending rate can be reduced.

As schematically illustrated in FIG. 1, to address the above identified issues, a computing system 10 for managing congestion control of packets routed through a packet-switched computer network is provided. The computing system 10 is illustrated as comprising a first computing device 12 including one or more processors 14 and memory 16, and a second computing device 18 including one or more processors 20 and memory 22, with the first and second computing devices 12, 18 being in communication with one another via a network 24 including one or more routers R. The illustrated implementation is exemplary in nature, and other configurations are possible. In the description of FIG. 1 below, the first computing device will be described as a server computing device 12 and the second computing device will be described as a client computing device 18, and respective functions carried out at each device will be described. It will be appreciated that in other configurations, the first computing device could be a computing device other than server computing device 12, such as an intermediate networking device such as a router, gateway, load balancer, firewall, etc. In some configurations, the computing system 10 may include a single computing device that carries out the salient functions of both the server computing device 12 and test computing device 18. In other alternative configurations, functions described as being carried out at the client computing device 18 may alternatively be carried out at the server computing device 12 and vice versa.

Continuing with FIG. 1, the server computing device 12 may, for example, take the form of a server provisioned in a data center, for example. As discussed above, the server computing device 12 includes one or more processors 12 and associated memory 14. The one or more processors 12 are configured to execute instructions using portions of the associated memory 14 to implement a network traffic manager 26. As illustrated, the network traffic manager 26 may include a load balancer 28 that is configured to distribute network traffic and a congestion controller 30 that controls the entry of packets into the network to avoid congestion collapse.

The congestion controller 30 determines message parameters 32 for packets of a plurality of messages according to a plurality of transport protocols over the network. The message parameters may be determined by message information such as priority, packet loss awareness, size, accuracy requirements, and the like, for example. Based on the message parameters 32 associated with each packet, the congestion controller 30 assigns a congestion control algorithm setting to each packet. For example, the congestion control algorithm setting may be a setting indicating application of a buffer length based congestion control algorithm (BLCC), a packet loss based congestion control algorithm (PLCC), or no congestion control algorithm (NO CC). The congestion control algorithms are selected from a congestion control algorithm pool 34 comprising a plurality of congestion control algorithms. As discussed in detail below, a message marker 36 is configured to mark packets having the buffer length based congestion control algorithm setting with a 2-bit flag.

The server computing device 12 further includes a network stack 38 to manage communications with other devices. The network stack 38 includes an application layer 40, a remote procedure call (RPC) layer 42, a TCP layer 44, a user datagram protocol (UDP) layer 46, an internet protocol (IP) layer 48, a datalink layer 50, and a physical layer 52. It will be appreciated that the TCP layer 44 may be implemented as a TCP/IP layer, an MPTCP layer, or any other suitable transmission protocol.

When a message is ready to be transmitted to the client computing device 18, the packets of the message are transmitted to a server socket 56. The socket 56 includes a send buffer that is configured to receive and temporarily store the packets in a queue. As discussed in detail below with reference to FIGS. 3 and 4, the send buffer 54 has a plurality of threshold queue positions, and the congestion controller 30 is configured to select a congestion control action for each packet in the subset from a plurality of predefined congestion control actions, based upon the assigned congestion control algorithm setting for each respective packet in the subset and based on a position of each respective packet in the subset relative to the plurality of threshold queue positions. Upon transmission, the packets are routed through the packet-switched computer network and enter one or more queues of a receiver buffer 58 at a client socket 60 and are subsequently processed via a network stack 62 at the client computing device 18. If transmission is successful, the client computing device 18 may send an acknowledgment (ACK) message to the server computing device 12.

Figure 2:
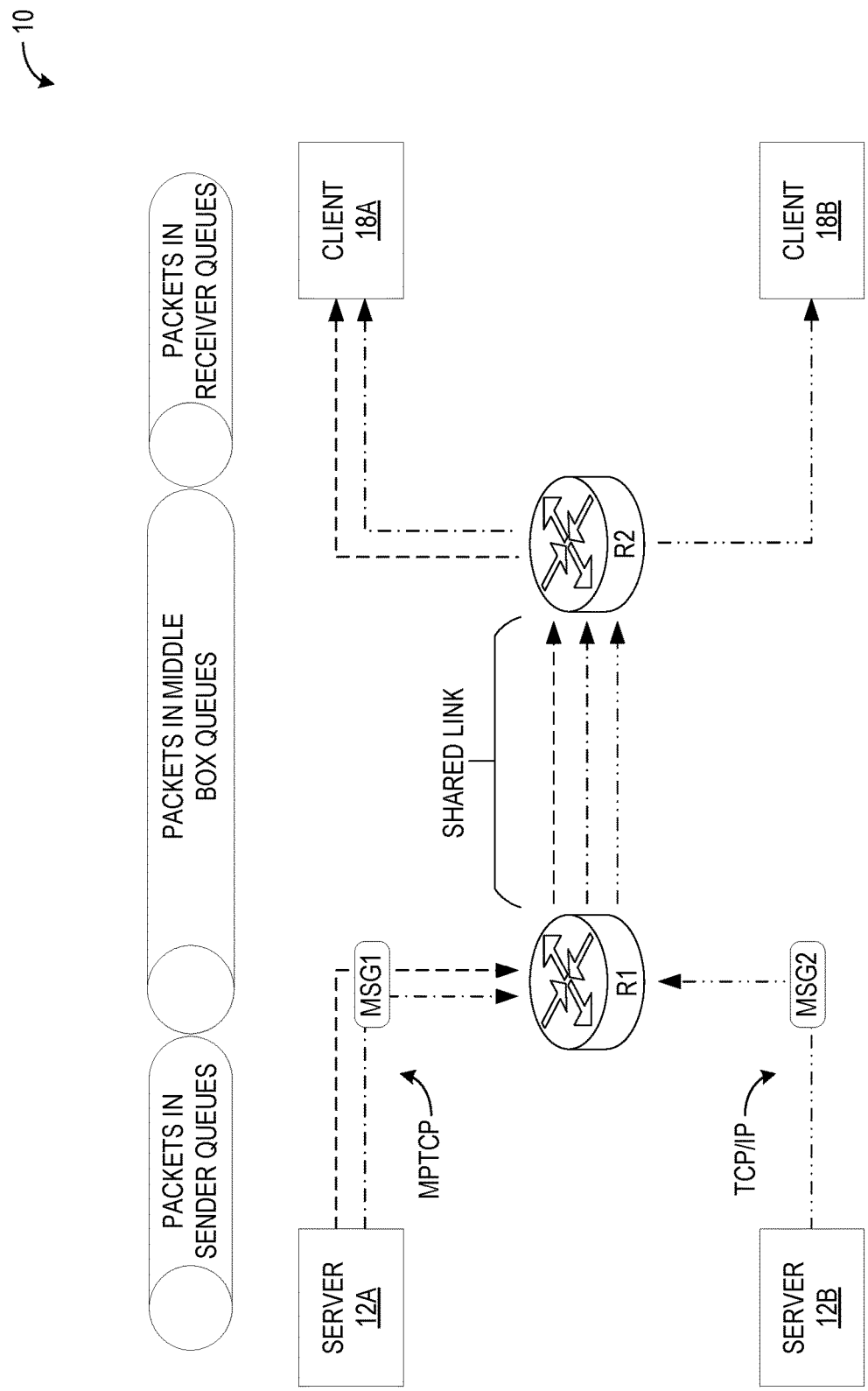
FIG. 2 shows an example of network traffic on a shared link of the computing system of FIG. 1.

Turning to FIG. 2, an example of network traffic on a packet-switched computer network having a shared link for packets sent according to two or more transport protocols, is shown. In the illustrated example, a first server computing device 12A is sending a first message MSG1 to a first client computing device 18A via MPTCP, as indicated by the dashed and dash dot lines. A second server computing device 12B is sending a second message MSG2 to a second client computing device 18B via TCP/IP, as indicated by the dash dot dot line. The messages MSG1, MSG2 are routed through a first router R1 and a second router R2 before being delivered to the respective client devices 18A, 18B. As indicated, the connection between the routers R1, R2 is a shared link. Like the server and client computing devices 12, 18 discussed above with reference to FIG. 1, the routers R1, R2 each have a socket with send and receive buffers, and each buffer has a plurality of threshold queue positions.

Figure 3:
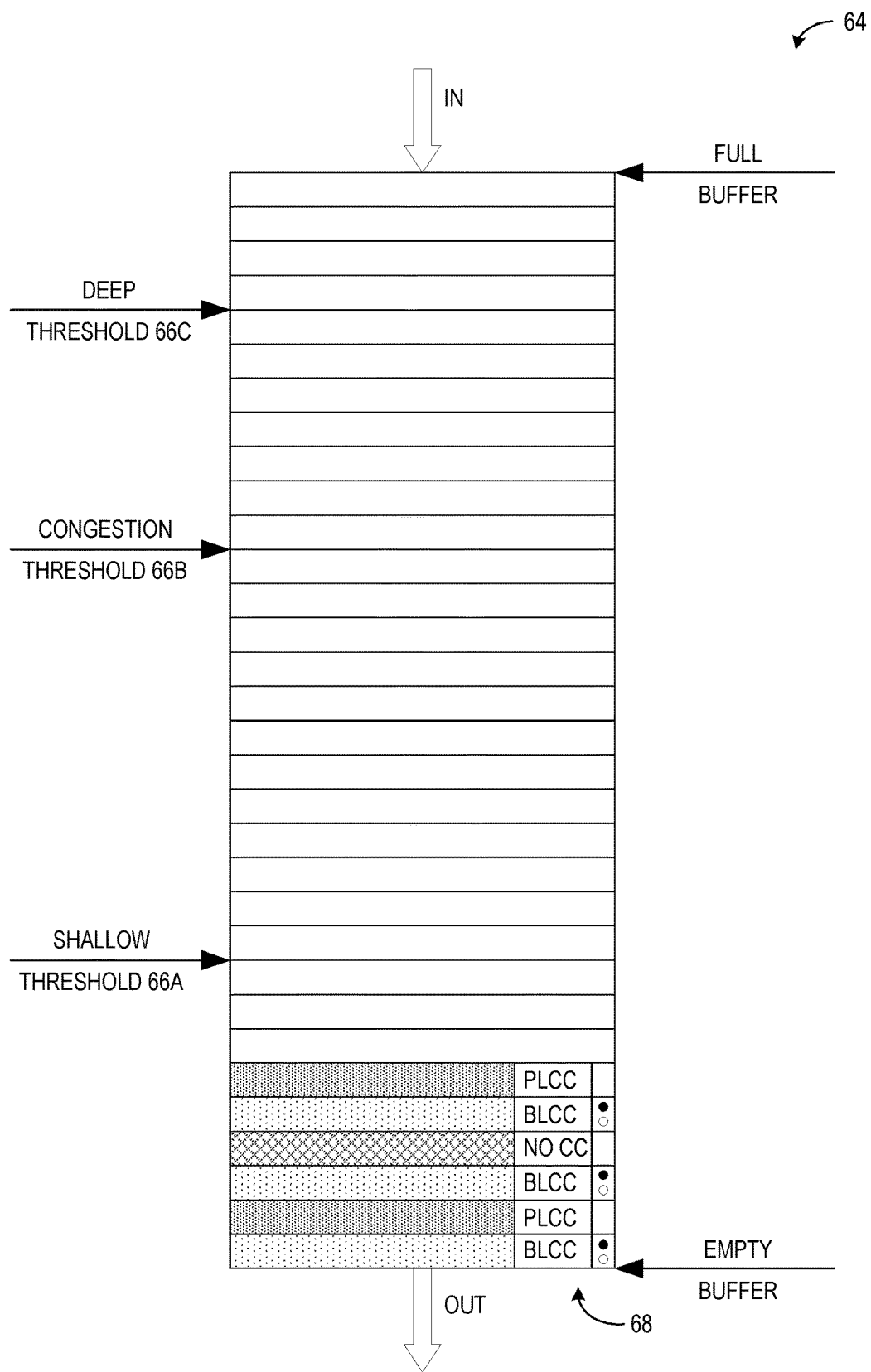
FIG. 3 shows a schematic view of a buffer of the computing system of FIG. 4 shows a flow diagram of a method for determining a congestion control action for the computing system of FIG. 1.
Figure 4:
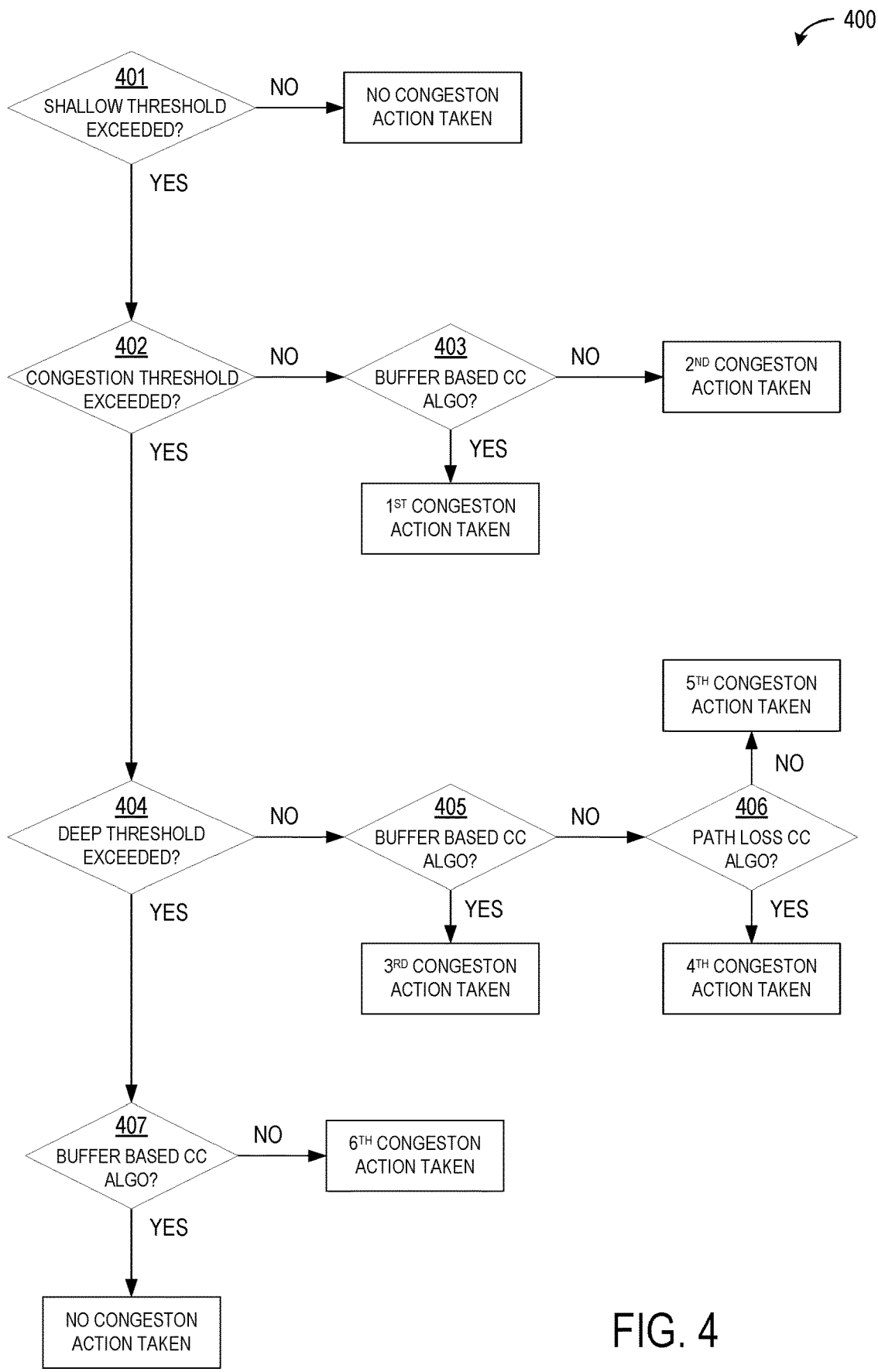

FIGS. 3 and 4 are directed to situations in which (a) the buffer includes one or more of the packets having the buffer length based congestion control algorithm (BLCC) setting, and (b) the buffer includes one or more of the packets having the setting indicating packet loss based congestion control algorithm (PLCC) and/or one or more of the packets having the setting indicating no congestion control algorithm (NO CC). It will be appreciated that a "device" may be a server computing device, a client computing device, a router, or any other computing device that has a buffer to control the flow of outgoing or incoming messages and/or packets.

FIG. 3 shows a schematic view of a buffer 64. It will be appreciated that the buffer 64 may be implemented as the send buffer 54, the receive buffer 58, or any other type of buffer, such as a buffer at a router or another device. As described above and illustrated in FIG. 3, the buffer 64 has a plurality of threshold queue positions 66. A first threshold queue position is a shallow threshold 66A, a second threshold queue position is a congestion threshold 66B, and a third threshold queue position is a deep threshold 66C. While the illustrated example includes three threshold queue positions, it will be appreciated that the quantity of threshold queue positions may be any suitable number.

As discussed above, each threshold queue position 66 has an associated plurality of congestion control actions, and a congestion control action of the plurality of congestion control actions is selected for each packet based upon the assigned congestion control algorithm setting. Also as discussed above, packets having the BLCC are marked with a 2-bit flag, as indicated by the black circle in the header information 68 of the BLCC packets in FIG. 3.

The congestion controller 30 is configured to determine that a subset of packets in the buffer 64 exceeds at least the first threshold, i.e., the shallow threshold 66A. When it is determined that (c1) the number of packets in the buffer exceeds the shallow threshold 66A and is less than or equal to the congestion threshold 66B, the congestion controller 30 will randomly select packets having the setting indicating the BLCC to be marked with congestion information, such as an explicit congestion notification (ECN) or inband network telemetry (INT), for example, as indicated by the open circle in the header information 68 of the BLCC packets in FIG. 3. Packets having the setting indicating the PLCC or NO CC, may be dropped. The possibility of being selected to be dropped is positively correlated with the number of packets above the shallow threshold, as shown below in Equation 1.

$$\text{possibility\_selected} := \frac{\text{buffer\_length\_current}_i - \text{shallow\_threshold}}{\text{congestion\_threshold} - \text{shallow\_threshold}} \quad (1)$$

When it is determined that (c2) the number of packets in the buffer exceeds the congestion threshold 66B and is less than or equal to the deep threshold 66C, all packets having the setting indicating the BLCC are marked with congestion information. Randomly selected packets having the setting indicating the PLCC are dropped evenly across different flows. Packets having setting indicating NO CC are dropped in correlation with a number of total packets above the congestion threshold. The possibility for being selected to be dropped is calculated as shown below in Equation 2.

$$\text{possibility\_selected} := \frac{\text{buffer\_length\_current}_i - \text{congestion\_threshold}}{\text{deep\_threshold} - \text{congestion\_threshold}} \quad (2)$$

When it is determined that (c3) the number of packets in the buffer exceeds the deep threshold, all incoming packets having the setting indicating the PLCC or the setting indicating NO CC are dropped. When packets having the setting indicating the BLCC share the same path with packets having the setting indicating the PLCC, and/or packets with setting indicating NO CC, the flags of the packets having the setting indicating the BLCC may be modified to indicate that the setting indicating the BLCC packets were on a mixed-type path.

FIG. 4 shows a flow diagram of a method for determining a congestion control action. At a step 401, the device may query whether (c1) the number of packets in the buffer exceeds the shallow threshold 66A. If NO, no action is taken. If YES, at step 402, the device may query whether (c2) the number of the packets in the buffer exceeds the congestion threshold 66B. If NO, at step 403, the device may query which packets have the setting indicating the BLCC. If YES, a first congestion control action is performed to mark randomly selected packets having the setting indicating the BLCC with congestion information. If NO, a second congestion control action is performed to drop randomly selected packets having the setting indicating the PLCC or setting indicating NO CC.

If the response to the query at step 402 is YES, at step 404 the device may query if the whether (c3) the number of packets in the queue exceeds the deep threshold 66C. If NO, at step 405, the device may query which packets have the setting indicating the BLCC. If YES, a third congestion control action is performed to mark packets having the setting indicating the BLCC with congestion information. If NO, at step 406, the device may query which packets have the setting indicating the PLCC. If YES, a fourth congestion control action is performed to drop randomly selected packets having the setting indicating the PLCC evenly across different flows. If NO, a fifth congestion control action is performed to drop packets having setting indicating NO CC in correlation with a number of total packets above the congestion threshold.

If the response to the query at step 404 is YES and the number of packets in the buffer exceeds the deep threshold 66C, at step 407, the device may query which packets have the setting indicating the BLCC. If YES, no action is taken. If NO, a sixth congestion control action (6) is performed to drop all incoming packets having the setting indicating the PLCC or setting indicating NO CC.

Different congestion control algorithms of the same type may have different AIMD formulas and parameters. The flows with higher increase rate and lower deduction rate are more likely to recover the sending rate or even acquire more sending rate after a deduction happens on the link. To achieve fairness between the different congestion control algorithms, devices may mark packets in a flow with a same type selection weight based on both its sending rate and number of paths belonging to the same connection, as shown below in Equation 3.

$$\text{weight}_i := \frac{\text{sending\_rate}_i \times \text{path\_number}_i}{\text{sending\_rate}_{total} \times \text{priority}_i} \quad (3)$$

where a higher weight indicates an increased chance the packet will be marked or dropped.

Figure 5:
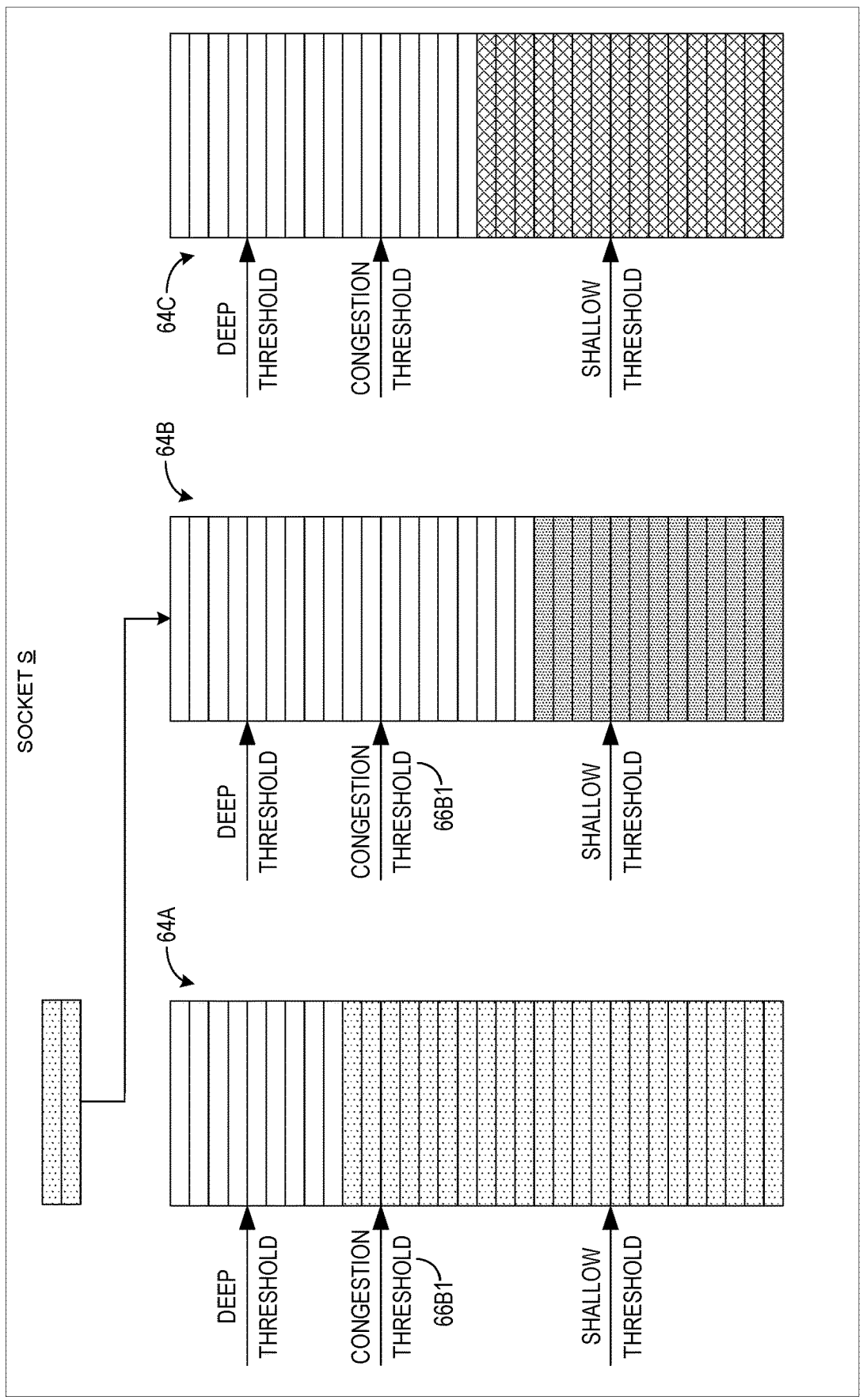
FIG. 5 shows an example of bandwidth sharing between buffers of the computing system of FIG. 1.

FIG. 5 shows an example of bandwidth sharing between buffers. It will be appreciated that FIG. 5 is directed to situations in which the socket S includes a plurality of buffers, and each packet is assigned to a buffer according to its respective congestion control algorithm. As illustrated, packets assigned to a first buffer 64A have the setting indicating the BLCC, packets assigned to a second buffer 64B have the setting indicating the PLCC, and packets assigned to a third buffer 64C have the setting indicating NO CC. In the illustrated example, the number of packets in the first buffer 64A exceeds the congestion threshold 66B 1, yet more packets having the setting indicating the BLCC are arriving. In this situation, arriving packets having the setting indicating the BLCC that are assigned to the first buffer 64A are allocated to the second buffer 64B for which the number of packets in the buffer does not exceed the congestion threshold 66B2. It will be appreciated that the bandwidth sharing is only available when the number of packets in the second buffer 64B has not exceeded the congestion threshold 66B 1. When the number of packets in the buffer 64B exceeds the congestion threshold 66B 1, packets having the setting indicating the BLCC are transmitted to the first buffer 64A where they are processed according to the actions described above with reference to FIG. 4.

Figure 6:
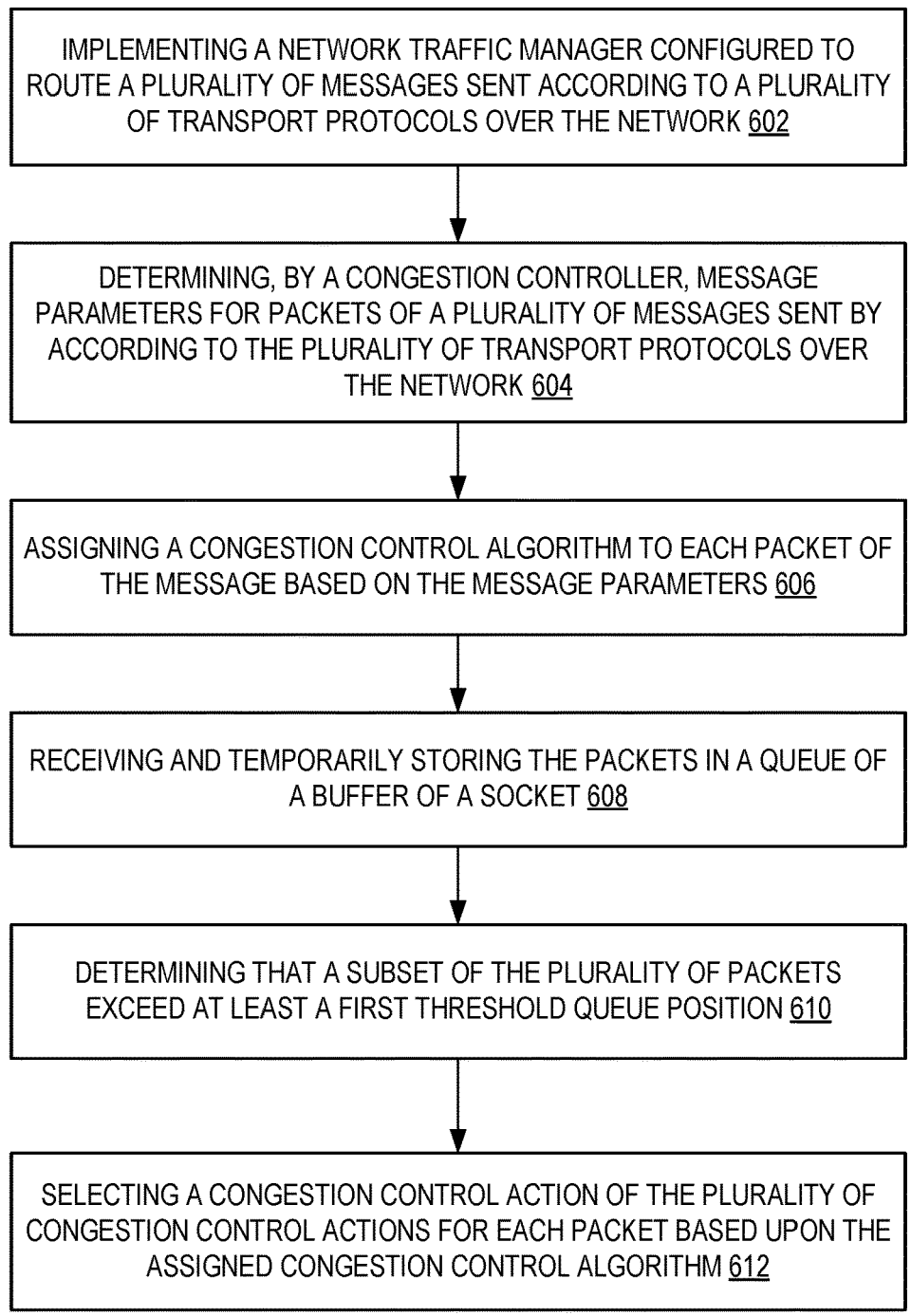
FIG. 6 shows a flow diagram of a method for managing congestion control of packets routed through a packet-switched computer network, which may be implemented by the computing system of FIG. 1 or other suitable hardware and software.

FIG. 6 shows a flowchart for a method 600 for managing congestion control of packets routed through a packet-switched computer network. Method 600 may be implemented by the hardware and software of computing system 10 described above, or by other suitable hardware and software. At step 602, the method 600 may include implementing a network traffic manager that is configured to route a plurality of messages according to a plurality of transport protocols over the network. As described above, the transport protocols may be implemented as a TCP/IP layer, an MPTCP layer, or any other suitable transmission protocol.

Proceeding from step 602 to step 604, the method 600 may further include determining, by a congestion controller of the networking traffic manager, message parameters for packets of a plurality of messages sent by according to the plurality of transport protocols over the network. The message parameters may be based on message information such as priority, packet loss awareness, size, accuracy requirements, and the like, for example.

Advancing from step 604 to step 606, the method 600 may further include assigning a congestion control algorithm setting to each packet based on the message parameters associated with each packet. As described above, the congestion control algorithms may include a setting indicating a buffer length based congestion control algorithm, a setting indicating a packet loss based congestion control algorithm, or a setting indicating no congestion control algorithm. Packets having the setting indicating the PLCC may be marked with a 2-bit flag.

Continuing from step 606 to step 608, the method 600 may further include receiving and temporarily storing the packets in a queue of a buffer of a socket, the buffer having a plurality of threshold queue positions. A first threshold queue position of the plurality of threshold queue positions may be a shallow threshold, a second threshold queue position of the plurality of threshold queue positions may be a congestion threshold, and a third threshold queue position of the plurality of threshold queue positions may be a deep threshold.

Proceeding from step 608 to step 610, the method 600 may further include determining that a subset of the plurality of packets exceed at least a first threshold queue position of the plurality of threshold queue positions in the buffer Advancing from step 610 to step 612, the method 600 may further include selecting a congestion control action for each packet in the subset from a plurality of predefined congestion control actions. The congestion control action may be selected based upon the assigned congestion control algorithm setting for each respective packet in the subset and based on a position of each respective packet in the subset relative to the plurality of threshold queue positions. For example, when it is determined that (a) the buffer includes one or more packets having the setting indicating the BLCC, (b) the buffer includes one or more packets having the setting indicating the PLCC and/or one or more packets having the setting indicating NO CC, and (c1) the number of packets in the buffer exceeds the shallow threshold and is less than or equal to the congestion threshold, the method may include performing a first congestion control action to mark randomly selected packets having the setting indicating the BLCC with congestion information and performing a second congestion control action to drop randomly selected packets having the setting indicating the PLCC or the setting indicating NO CC.

Upon determining that (a) the buffer includes one or more packets having the setting indicating the BLCC, (b) the buffer includes one or more packets having the setting indicating the PLCC and/or one or more packets having the setting indicating NO CC, and (c2) the number of packets in the buffer exceeds the congestion threshold and is less than or equal to the deep threshold, the method may include performing a third congestion control action to mark packets having the setting indicating the BLCC with congestion information, performing a fourth congestion control action to drop randomly selected packets having the setting indicating the PLCC evenly across different flows, and/or performing a fifth congestion control action to drop packets having setting indicating NO CC in correlation with a number of total packets above the congestion threshold.

Upon determining that (a) the buffer includes packets having the setting indicating the BLCC, (b) the buffer includes packets having the setting indicating the PLCC and/or packets setting indicating NO CC, and (c3) the number of packets in the buffer exceeds the deep threshold, the method may include performing a sixth congestion control action to drop all incoming packets having the setting indicating the PLCC or setting indicating NO CC.

In some embodiments, the socket may include a plurality of buffers. As such, the method may include assigning each packet to a buffer of the plurality of buffers according to its respective congestion control algorithm setting. When the number of packets in a first buffer of the plurality of buffers exceeds the congestion threshold, the method may further include allocating packets assigned to the first buffer to a second buffer for which the number of packets does not exceed the congestion threshold. When packets having the setting indicating the BLCC share a path with packets having the setting indicating the PLCC and/or packets having the setting indicating NO CC, the method may further include modifying the flags of the packets having the setting indicating the BLCC to indicate that the packets were on a mixed-type path.

With the above embodiments, packets sent according to two different transfer protocols can be effectively routed while managing congestion in buffer queues in a manner that holistically takes into account the differing congestion control algorithms being applied to each packet. As a result, greater fairness can be achieved in packet routing, and the performance of client server applications can be improved, with fewer unexpected delays and session time-outs due to packet loss.

In some embodiments, the methods and processes described herein may be tied to a computing system of one or more computing devices. In particular, such methods and processes may be implemented as a computer-application program or service, an application-programming interface (API), a library, and/or other computer-program product.

Figure 7:
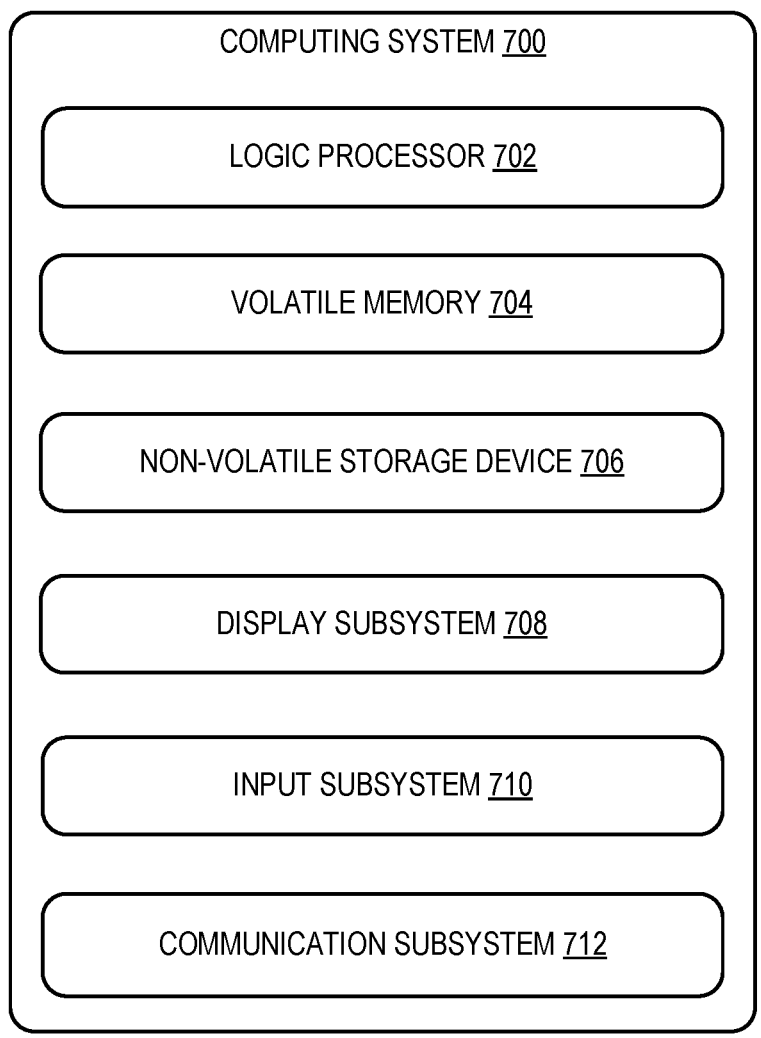
FIG. 7 shows a schematic view of an example computing environment in which the computing system of FIG. 1 may be enacted.

FIG. 7 schematically shows a non-limiting embodiment of a computing system 700 that can enact one or more of the methods and processes described above. Computing system 700 is shown in simplified form. Computing system 700 may embody the computer device 10 described above and illustrated in FIG. 1. Computing system 700 may take the form of one or more personal computers, server computers, tablet computers, home-entertainment computers, network computing devices, gaming devices, mobile computing devices, mobile communication devices (e.g., smart phone), and/or other computing devices, and wearable computing devices such as smart wristwatches and head mounted augmented reality devices.

Computing system 700 includes a logic processor 702 volatile memory 704, and a non-volatile storage device 706. Computing system 700 may optionally include a display subsystem 708, input subsystem 710, communication subsystem 712, and/or other components not shown in FIG. 7.

Logic processor 702 includes one or more physical devices configured to execute instructions. For example, the logic processor may be configured to execute instructions that are part of one or more applications, programs, routines, libraries, objects, components, data structures, or other logical constructs. Such instructions may be implemented to perform a task, implement a data type, transform the state of one or more components, achieve a technical effect, or otherwise arrive at a desired result.

The logic processor may include one or more physical processors (hardware) configured to execute software instructions. Additionally or alternatively, the logic processor may include one or more hardware logic circuits or firmware devices configured to execute hardware-implemented logic or firmware instructions. Processors of the logic processor 702 may be single-core or multi-core, and the instructions executed thereon may be configured for sequential, parallel, and/or distributed processing. Individual components of the logic processor optionally may be distributed among two or more separate devices, which may be remotely located and/or configured for coordinated processing. Aspects of the logic processor may be virtualized and executed by remotely accessible, networked computing devices configured in a cloud-computing configuration. In such a case, these virtualized aspects are run on different physical logic processors of various different machines, it will be understood.

Non-volatile storage device 706 includes one or more physical devices configured to hold instructions executable by the logic processors to implement the methods and processes described herein. When such methods and processes are implemented, the state of non-volatile storage device 706 may be transformed—e.g., to hold different data.

Non-volatile storage device 706 may include physical devices that are removable and/or built-in. Non-volatile storage device 706 may include optical memory (e.g., CD, DVD, HD-DVD, etc.), semiconductor memory (e.g., ROM, EPROM, EEPROM, FLASH memory, etc.), and/or magnetic memory (e.g., hard-disk drive, floppy-disk drive, tape drive, MRAM, etc.), or other mass storage device technology. Non-volatile storage device 706 may include nonvolatile, dynamic, static, read/write, read-only, sequential-access, location-addressable, file-addressable, and/or content-addressable devices. It will be appreciated that non-volatile storage device 706 is configured to hold instructions even when power is cut to the non-volatile storage device 706.

Volatile memory 704 may include physical devices that include random access memory. Volatile memory 704 is typically utilized by logic processor 702 to temporarily store information during processing of software instructions. It will be appreciated that volatile memory 704 typically does not continue to store instructions when power is cut to the volatile memory 704.

Aspects of logic processor 702, volatile memory 704, and non-volatile storage device 706 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 700 typically implemented in software by a processor to perform a particular function using portions of volatile memory, which function involves transformative processing that specially configures the processor to perform the function. Thus, a module, program, or engine may be instantiated via logic processor 702 executing instructions held by non-volatile storage device 706, using portions of volatile memory 704. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

When included, display subsystem 708 may be used to present a visual representation of data held by non-volatile storage device 706. The visual representation may take the form of a graphical user interface (GUI). As the herein described methods and processes change the data held by the non-volatile storage device, and thus transform the state of the non-volatile storage device, the state of display subsystem 708 may likewise be transformed to visually represent changes in the underlying data. Display subsystem 708 may include one or more display devices utilizing virtually any type of technology. Such display devices may be combined with logic processor 702, volatile memory 704, and/or non-volatile storage device 706 in a shared enclosure, or such display devices may be peripheral display devices.

When included, input subsystem 710 may comprise or interface with one or more user-input devices such as a keyboard, mouse, touch screen, touch pad, camera, or microphone.

When included, communication subsystem 712 may be configured to communicatively couple various computing devices described herein with each other, and with other devices. Communication subsystem 712 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computing system 700 to send and/or receive messages to and/or from other devices via a network such as the Internet.

The following paragraphs provide additional description of aspects of the present disclosure. One aspect provides a computing system for managing congestion control of packets routed through a packet-switched computer network. The computing system may comprise a processor and a socket. The processor may execute instructions using portions of associated memory to implement a network traffic manager. The network traffic manager may comprise a congestion controller that determines message parameters for packets of a plurality of messages sent according to a plurality of transport protocols over the network and assigns a congestion control algorithm setting to each packet based on message parameters associated with each packet. The socket may include a buffer configured to receive and temporarily store the packets in a queue. The queue of the buffer may have a plurality of threshold queue positions. The congestion controller may be configured to determine that a subset of the plurality of packets exceeds at least a first threshold queue position of a plurality of threshold queue positions in the buffer. The congestion controller may be further configured to select a congestion control action for each packet in the subset from a plurality of predefined congestion control actions, based upon the assigned congestion control algorithm setting for each respective packet in the subset and based on a position of each respective packet in the subset relative to the plurality of threshold queue positions.

In this aspect, additionally or alternatively, the congestion controller may assign to each packet a respective congestion control algorithm setting indicating application of a buffer length based congestion control algorithm, a packet loss based congestion control algorithm, or no congestion control algorithm to each packet.

In this aspect, additionally or alternatively, packets having the setting indicating the buffer length based congestion control algorithm may be marked with a 2-bit flag.

In this aspect, additionally or alternatively, the plurality of threshold queue positions may further include a second threshold queue position and a third threshold queue position. The first threshold queue position may be a shallow threshold. The second threshold queue position may be a congestion threshold. The third threshold queue position may be a deep threshold.

In this aspect, additionally or alternatively, upon determining that (a) the buffer includes one or more of the packets having the buffer length based congestion control algorithm setting, (b) the buffer includes one or more of the packets having the setting indicating the packet loss based congestion control algorithm, and/or one or more of the packets having the setting indicating no congestion control algorithm is applied, and (c1) the number of packets in the buffer exceeds the shallow threshold, and is less than or equal to the congestion threshold, the congestion controller may be configured to perform a first congestion control action to mark randomly selected packets having the setting indicating the buffer length based algorithm with congestion information, and perform a second congestion control action to drop randomly selected packets having the setting indicating the packet loss based congestion control algorithm and/or the setting indicating no congestion control algorithm is applied.

In this aspect, additionally or alternatively, upon determining that (a) the buffer includes one or more of the packets having the buffer length based congestion control algorithm setting, (b) the buffer includes one or more of the packets having the setting indicating the packet loss based congestion control algorithm, and/or one or more of the packets having the setting indicating no congestion control algorithm is applied, and (c2) the number of packets in the buffer exceeds the congestion threshold and is less than or equal to the deep threshold, the congestion controller may be configured to perform a third congestion control action to mark the packets having the setting indicating the buffer length based algorithm with congestion information, perform a fourth congestion control action to drop randomly selected packets having the setting indicating the packet loss based congestion control algorithm evenly across different flows, and/or perform a fifth congestion control action to drop packets having the setting indicating no congestion control algorithm is applied in correlation with a number of total packets above the congestion threshold.

In this aspect, additionally or alternatively, upon determining that (a) the buffer includes one or more of the packets having the buffer length based congestion control algorithm setting, (b) the buffer includes one or more of the packets having the setting indicating the packet loss based congestion control algorithm, and/or one or more of the packets having the setting indicating no congestion control algorithm is applied, and (c3) the number of packets in the buffer exceeds the deep threshold, the congestion controller may be configured to perform a sixth congestion control action to drop all incoming packets having the setting indicating the loss packet based congestion control algorithm or the setting indicating no congestion control algorithm.

In this aspect, additionally or alternatively, the buffer of the socket may be one of a plurality of buffers, and each packet may be assigned to a buffer according to its respective congestion control algorithm setting.

In this aspect, additionally or alternatively, the congestion controller may be configured to, when the congestion threshold for a first buffer of the plurality of buffers is exceeded, allocate packets assigned to the first buffer to a second buffer for which the congestion threshold is not met.

In this aspect, additionally or alternatively, the congestion controller may be configured to, when packets having the setting indicating the buffer length based congestion control algorithm share a same path with packets having the setting indicating the packet loss based congestion control algorithm and/or packets having the setting indicating no congestion control algorithm, modify the flags of the packets having the buffer length based algorithm setting to indicate that the packets were on a mixed-type path.

Another aspect provides a method for managing congestion control of packets routed through a packet-switched computer network. The method may comprise, at a processor, implementing a network traffic manager configured to route a plurality of messages sent according to a plurality of transport protocols over the network; determining, by a congestion controller of the networking traffic manager, message parameters for packets of a plurality of messages sent by according to the plurality of transport protocols over the network; assigning a congestion control algorithm setting to each packet based on the message parameters associated with each packet; receiving and temporarily storing the packets in a queue of a buffer of a socket, the buffer having a plurality of threshold queue positions; determining that a subset of the plurality of packets exceed at least a first threshold queue position of the plurality of threshold queue positions in the buffer; and selecting a congestion control action for each packet in the subset from a plurality of predefined congestion control actions, based upon the assigned congestion control algorithm setting for each respective packet in the subset and based on a position of each respective packet in the subset relative to the plurality of threshold queue positions.

In this aspect, additionally or alternatively, the method may further comprise assigning to each packet a setting indicating a buffer length based congestion control algorithm, a setting indicating a packet loss based congestion control algorithm, or a setting indicating no congestion control algorithm. Packets having the buffer length based congestion control algorithm may be marked with a 2-bit flag.

In this aspect, additionally or alternatively, the plurality of threshold queue positions may further include a second threshold queue position and a third threshold queue position. The first threshold queue position may be a shallow threshold. The second threshold queue position may be a congestion threshold. The third threshold queue position may be a deep threshold.

In this aspect, additionally or alternatively, the method may further comprise, upon determining that (a) the buffer includes one or more packets having the setting indicating the buffer length based congestion control algorithm, (b) the buffer includes one or more packets having the setting indicating the packet loss based congestion control algorithm, and/or one or more packets having the setting indicating no congestion control algorithm is applied, and (c1) the number of packets in the buffer exceeds the shallow threshold and is less than or equal to the congestion threshold: performing a first congestion control action to mark randomly selected packets having the setting indicating the buffer length based algorithm with congestion information;

and performing a second congestion control action to drop randomly selected packets having the setting indicating the packet loss based congestion control algorithm or the setting indicating no congestion control algorithm is applied.

In this aspect, additionally or alternatively, the method may further comprise, upon determining that (a) the buffer includes one or more packets having the setting indicating the buffer length based congestion control algorithm, (b) the buffer includes one or more packets having the setting indicating the packet loss based congestion control algorithm, and/or the buffer includes packets having the setting indicating no congestion control algorithm is applied, and (c2) the number of packets in the buffer exceeds the congestion threshold and is less than or equal to the deep threshold: performing a third congestion control action to mark packets having the setting information indicating the buffer length based algorithm with congestion information; performing a fourth congestion control action to drop randomly selected packets having the setting indicating the packet loss based congestion control algorithm evenly across different flows; and/or performing a fifth congestion control action to drop packets having the setting indicating no congestion control algorithm is applied, in correlation with a number of total packets above the congestion threshold.

In this aspect, additionally or alternatively, the method may further comprise, upon determining that (a) the buffer includes the packets having the setting indicating the buffer length based congestion control algorithm, (b) the buffer includes the packets having the setting indicating the packet loss based congestion control algorithm, and/or the packets having the setting indicating no congestion control algorithm is applied, and (c2) the number of packets in the buffer exceeds the deep threshold: performing a sixth congestion control action to drop all incoming packets having the setting indicating the packet loss based congestion control algorithm or the setting indicating no congestion control algorithm is applied.

In this aspect, additionally or alternatively, the buffer of the socket may be one of a plurality of buffers in the socket, and the method may further comprise assigning each packet to a buffer of the plurality of buffers according to its respective congestion control algorithm setting.

In this aspect, additionally or alternatively, the method may further comprise, when the congestion threshold for a first buffer of the plurality of buffers is exceeded, allocating packets assigned to the first buffer to a second buffer for which the congestion threshold is not met.

In this aspect, additionally or alternatively, the method may further comprise, when the packets having a setting indicating a buffer length based algorithm share a path with packets having a setting indicating the packet loss based congestion control algorithm and/or a setting indicating no congestion control algorithm is applied, modifying the flags of the packets having the setting indicating the buffer length based algorithm to indicate that the packets were on a mixed-type path.

Another aspect provides a computing system for managing congestion control of packets routed through a packet-switched computer network. The computing system may comprise a processor and a socket. The processor may execute instructions using portions of associated memory to implement a network traffic manager. The network traffic manager may comprise a congestion controller that determines message parameters for packets of a plurality of messages sent according to a plurality of transport protocols over the network and assigns a congestion control algorithm setting to each packet based on message parameters associated with each packet. The plurality of protocols may include Transport Control Protocol (TCP) and Uniform Datagram Protocol (UDP). The respective congestion control algorithm setting may indicate application of a buffer length based congestion control algorithm, a packet loss based congestion control algorithm, or no congestion control algorithm. The socket may include a buffer configured to receive and temporarily store the packets in a queue. The queue of the buffer may have a plurality of threshold queue positions. The congestion controller may be configured to determine a relative position of a subset of the plurality of packets exceeds only a first threshold queue position, exceeds a first and a second threshold queue position, or exceeds a first, second, and third threshold queue position; and select a congestion control action for each packet of the subset from a plurality of predefined congestion control actions, based upon the assigned congestion control algorithm setting for each respective packet of the subset and based on the determined relative position of each respective packet of the subset.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A computing system for managing congestion control of packets routed through a packet-switched computer network, comprising:
a processor that executes instructions using portions of associated memory to implement a network traffic manager, the network traffic manager comprising a congestion controller that determines message parameters for packets of a plurality of messages sent according to a plurality of transport protocols over the network and assigns a congestion control algorithm setting to each packet based on message parameters associated with each packet; and
a socket including a buffer configured to receive and temporarily store the packets in a queue, the queue of the buffer having a plurality of threshold queue positions, wherein
the congestion controller is configured to:
determine that a subset of the plurality of packets exceeds at least a first threshold queue position of a plurality of threshold queue positions in the buffer; and
select a congestion control action for each packet in the subset from a plurality of predefined congestion control actions, based upon the assigned congestion control algorithm setting for each respective packet in the subset and based on a position of each respective packet in the subset relative to the plurality of threshold queue positions.

2. The computing system of claim 1, wherein
the congestion controller assigns to each packet a respective congestion control algorithm setting indicating application of a buffer length based congestion control algorithm, a packet loss based congestion control algorithm, or no congestion control algorithm to each packet.

3. The computing system of claim 2, wherein
packets having the setting indicating the buffer length based congestion control algorithm are marked with a 2-bit flag.

4. The computing system of claim 2, wherein
the plurality of threshold queue positions further includes a second threshold queue position and a third threshold queue position,
the first threshold queue position is a shallow threshold,
the second threshold queue position is a congestion threshold, and
the third threshold queue position is a deep threshold.

5. The computing system of claim 4, wherein
the congestion controller, upon determining that
 (a) the buffer includes one or more of the packets having the buffer length based congestion control algorithm setting,
 (b) the buffer includes one or more of the packets having the setting indicating the packet loss based congestion control algorithm, and/or one or more of the packets having the setting indicating no congestion control algorithm is applied, and
 (c1) the number of packets in the buffer exceeds the shallow threshold, and is less than or equal to the congestion threshold,
is configured to:
 perform a first congestion control action to mark randomly selected packets having the setting indicating the buffer length based algorithm with congestion information, and
 perform a second congestion control action to drop randomly selected packets having the setting indicating the packet loss based congestion control algorithm and/or the setting indicating no congestion control algorithm is applied.

6. The computing system of claim 4, wherein
the congestion controller, upon determining that:
 (a) the buffer includes one or more packets having the setting indicating the buffer length based congestion control algorithm,
 (b) the buffer includes one or more of the packets having the setting indicating the packet loss based congestion control algorithm, and/or one or more of the packets having the setting indicating the no congestion control algorithm is applied; and
 (c2) the number of packets in the buffer exceeds the congestion threshold and is less than or equal to the deep threshold,
is configured to:
 perform a third congestion control action to mark the packets having the setting indicating the buffer length based algorithm with congestion information,
 perform a fourth congestion control action to drop randomly selected packets having the setting indicating the packet loss based congestion control algorithm evenly across different flows, and/or
 perform a fifth congestion control action to drop packets having the setting indicating no congestion control algorithm is applied in correlation with a number of total packets above the congestion threshold.

7. The computing system of claim 4, wherein
the congestion controller, upon determining that:
 (a) the buffer includes the packets having the setting indicating the buffer length based congestion control algorithm,
 (b) the buffer includes packets having the setting indicating the packet loss based congestion control algorithm, and/or the packets having the setting indicating no congestion control algorithm is applied, and
 (c3) the number of packets in the buffer exceeds the deep threshold,
is configured to:
 perform a sixth congestion control action to drop all incoming packets having the setting indicating the loss packet based congestion control algorithm or the setting indicating no congestion control algorithm.

8. The computing system of claim 1, wherein
the buffer of the socket is one of a plurality of buffers, and
each packet is assigned to a buffer according to its respective congestion control algorithm setting.

9. The computing system of claim 8, wherein
the congestion controller is configured to, when the congestion threshold for a first buffer of the plurality of buffers is exceeded, allocate packets assigned to the first buffer to a second buffer for which the congestion threshold is not met.

10. The computing system of claim 1, wherein
the congestion controller is configured to, when packets having the setting indicating the buffer length based congestion control algorithm share a same path with packets having the setting indicating the packet loss based congestion control algorithm and/or packets having the setting indicating no congestion control algorithm, modify the flags of the packets having the buffer length based algorithm setting to indicate that the packets were on a mixed-type path.

11. A method for managing congestion control of packets routed through a packet-switched computer network, the method comprising:
 at a processor, implementing a network traffic manager configured to route a plurality of messages sent according to a plurality of transport protocols over the network;
 determining, by a congestion controller of the networking traffic manager, message parameters for packets of a plurality of messages sent by according to the plurality of transport protocols over the network;
 assigning a congestion control algorithm setting to each packet based on the message parameters associated with each packet;
 receiving and temporarily storing the packets in a queue of a buffer of a socket, the buffer having a plurality of threshold queue positions;
 determining that a subset of the plurality of packets exceed at least a first threshold queue position of the plurality of threshold queue positions in the buffer; and
 selecting a congestion control action for each packet in the subset from a plurality of predefined congestion control actions, based upon the assigned congestion control algorithm setting for each respective packet in the subset and based on a position of each respective packet in the subset relative to the plurality of threshold queue positions.

12. The method of claim 11, the method further comprising:
 assigning to each packet a setting indicating a buffer length based congestion control algorithm, a setting indicating a packet loss based congestion control algorithm, or a setting indicating no congestion control algorithm, wherein packets having the buffer length based congestion control algorithm are marked with a 2-bit flag.

13. The method of claim 12, wherein
the plurality of threshold queue positions further includes a second threshold queue position and a third threshold queue position,
the first threshold queue position is a shallow threshold,
the second threshold queue position is a congestion threshold, and
the third threshold queue position is a deep threshold.

14. The method of claim 13, the method further comprising:
upon determining that (a) the buffer includes one or more packets having the setting indicating the buffer length based congestion control algorithm, (b) the buffer includes one or more packets having the setting indicating the packet loss based congestion control algorithm, and/or one or more packets having the setting indicating no congestion control algorithm is applied, and (c1) the number of packets in the buffer exceeds the shallow threshold and is less than or equal to the congestion threshold:
performing a first congestion control action to mark randomly selected packets having the setting indicating the buffer length based algorithm with congestion information; and
performing a second congestion control action to drop randomly selected packets having the setting indicating the packet loss based congestion control algorithm or the setting indicating no congestion control algorithm is applied.

15. The method of claim 13, the method further comprising:
upon determining that (a) the buffer includes one or more packets having the setting indicating the buffer length based congestion control algorithm, (b) the buffer includes one or more packets having the setting indicating the packet loss based congestion control algorithm, and/or the buffer includes packets having the setting indicating no congestion control algorithm is applied, and (c2) the number of packets in the buffer exceeds the congestion threshold and is less than or equal to the deep threshold:
performing a third congestion control action to mark packets having the setting information indicating the buffer length based algorithm with congestion information;
performing a fourth congestion control action to drop randomly selected packets having the setting indicating the packet loss based congestion control algorithm evenly across different flows; and/or
performing a fifth congestion control action to drop packets having the setting indicating no congestion control algorithm is applied, in correlation with a number of total packets above the congestion threshold.

16. The method of claim 13, the method further comprising:
upon determining that (a) the buffer includes the packets having the setting indicating the buffer length based congestion control algorithm, (b) the buffer includes the packets having the setting indicating the packet loss based congestion control algorithm, and/or the packets having the setting indicating no congestion control algorithm is applied, and (c2) the number of packets in the buffer exceeds the deep threshold:
performing a sixth congestion control action to drop all incoming packets having the setting indicating the packet loss based congestion control algorithm or the setting indicating no congestion control algorithm is applied.

17. The method of claim 11, wherein
the buffer of the socket is one of a plurality of buffers in the socket, and
the method further comprises assigning each packet to a buffer of the plurality of buffers according to its respective congestion control algorithm setting.

18. The method of claim 17, the method further comprising:
when the congestion threshold for a first buffer of the plurality of buffers is exceeded, allocating packets assigned to the first buffer to a second buffer for which the congestion threshold is not met.

19. The method of claim 18, the method further comprising:
when the packets having a setting indicating a buffer length based algorithm share a path with packets having a setting indicating the packet loss based congestion control algorithm and/or a setting indicating no congestion control algorithm is applied, modifying the flags of the packets having the setting indicating the buffer length based algorithm to indicate that the packets were on a mixed-type path.

20. A computing system for managing congestion control of packets routed through a packet-switched computer network, comprising:
a processor that executes instructions using portions of associated memory to implement a network traffic manager, the network traffic manager comprising a congestion controller that determines message parameters for packets of a plurality of messages sent according to a plurality of transport protocols over the network and assigns a congestion control algorithm setting to each packet based on message parameters associated with each packet, the plurality of protocols including Transport Control Protocol (TCP) and Uniform Datagram Protocol (UDP), the respective congestion control algorithm setting indicating application of a buffer length based congestion control algorithm, a packet loss based congestion control algorithm, or no congestion control algorithm; and
a socket including a buffer configured to receive and temporarily store the packets in a queue, the queue of the buffer having a plurality of threshold queue positions, wherein
the congestion controller is configured to:
determine a relative position of a subset of the plurality of packets exceeds only a first threshold queue position, exceeds a first and a second threshold queue position, or exceeds a first, second, and third threshold queue position; and
select a congestion control action for each packet of the subset from a plurality of predefined congestion control actions, based upon the assigned congestion control algorithm setting for each respective packet of the subset and based on the determined relative position of each respective packet of the subset.

* * * * *